(12) United States Patent
Kim et al.

(10) Patent No.: US 10,054,150 B2
(45) Date of Patent: Aug. 21, 2018

(54) DUAL PROTECTION CAP FOR BOLT AND NUT

(76) Inventors: Lee Nam Kim, Chungcheongnam-do (KR); Jae Ho Jin, Gyeonggi-do (KR)

( * ) Notice: Subject to any disclaimer, the term of this patent is extended or adjusted under 35 U.S.C. 154(b) by 23 days.

(21) Appl. No.: 14/125,996

(22) PCT Filed: Mar. 14, 2012

(86) PCT No.: PCT/KR2012/001827
§ 371 (c)(1),
(2), (4) Date: Dec. 13, 2013

(87) PCT Pub. No.: WO2012/124972
PCT Pub. Date: Sep. 20, 2012

(65) Prior Publication Data
US 2014/0161559 A1    Jun. 12, 2014

(30) Foreign Application Priority Data

Mar. 16, 2011  (KR) .................. 10-2011-0023368

(51) Int. Cl.
*F16B 37/14*  (2006.01)
*F16B 37/00*  (2006.01)

(52) U.S. Cl.
CPC ............ *F16B 37/14* (2013.01); *F16B 37/005* (2013.01)

(58) Field of Classification Search
CPC ...................................................... F16B 37/14
USPC ........... 411/429, 431, 372.5, 372.6, 373, 377
See application file for complete search history.

(56) References Cited

U.S. PATENT DOCUMENTS

| 2,103,743 | A | * | 12/1937 | Doty | ..................... B60R 13/105 24/662 |
| 4,659,273 | A | * | 4/1987 | Dudley | ................. F16B 41/005 411/373 |
| 4,824,305 | A | * | 4/1989 | McCauley | ................ B60B 7/00 411/372 |
| 4,884,933 | A | * | 12/1989 | Preusker | ................. B60C 27/04 152/213 A |
| 4,890,967 | A | * | 1/1990 | Rosenbaum | ............ F16B 37/14 411/377 |
| 5,364,213 | A | * | 11/1994 | Teramura | ................ F16B 23/00 411/374 |

(Continued)

FOREIGN PATENT DOCUMENTS

| JP | 53051973 A | 12/1978 |
| JP | 59141209 A | 9/1984 |

(Continued)

*Primary Examiner* — Flemming Saether
(74) *Attorney, Agent, or Firm* — STIP Law Group, LLC

(57) ABSTRACT

The present invention pertains to a dual protection cap for a bolt and a nut. The present invention relates to a protection cap for a bolt and a nut, which is open at one side and covers a bolt and a nut so as to separate the same from the outside, and comprises: an outer cap and an inner cap are respectively injection molded with synthetic resin; fitting grooves, which are formed on the inside of the outer cap at a uniform interval in a longitudinal direction, are fitted and coupled with protrusion pieces, which are formed to protrude from the outer periphery of the inner cap at a uniform interval in a longitudinal direction; and triangular protrusion pieces are formed on the end portion of each of fixing pieces, which radially protrude from the peripheral surface of the bottom surface in the inner cap.

3 Claims, 7 Drawing Sheets

(56) References Cited

U.S. PATENT DOCUMENTS

| | | | | |
|---|---|---|---|---|
| 5,590,992 A * | 1/1997 | Russell | ..................... | B60B 7/14 |
| | | | | 301/37.374 |
| 6,135,691 A * | 10/2000 | Nadarajah | ............... | F16B 37/14 |
| | | | | 411/372.6 |
| 8,388,293 B2 * | 3/2013 | Hutter, III | ............... | F16B 37/14 |
| | | | | 411/377 |
| 2015/0367954 A1 * | 12/2015 | Rebbeck | ................ | B64D 37/32 |
| | | | | 361/218 |

FOREIGN PATENT DOCUMENTS

| JP | 11180456 A | 7/1999 |
|---|---|---|
| KR | 200439024 B1 | 3/2008 |

\* cited by examiner

[Fig. 1]
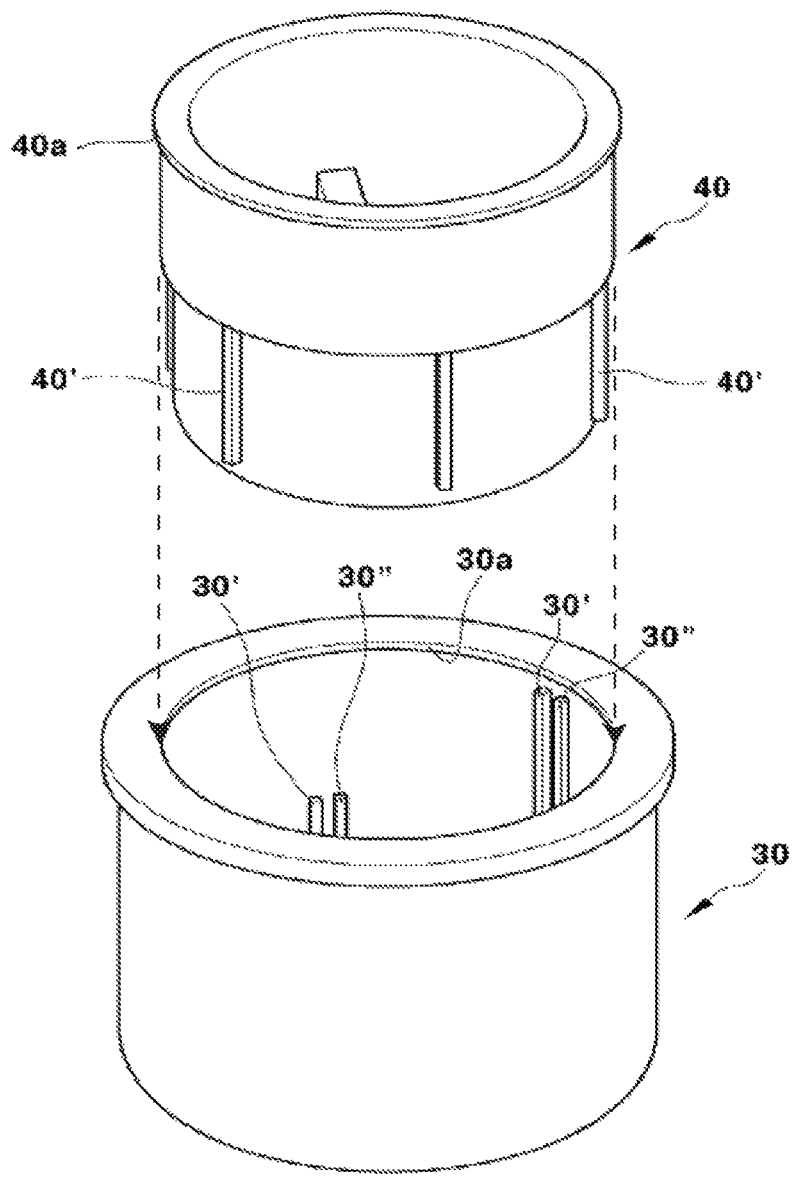

[Fig. 2]
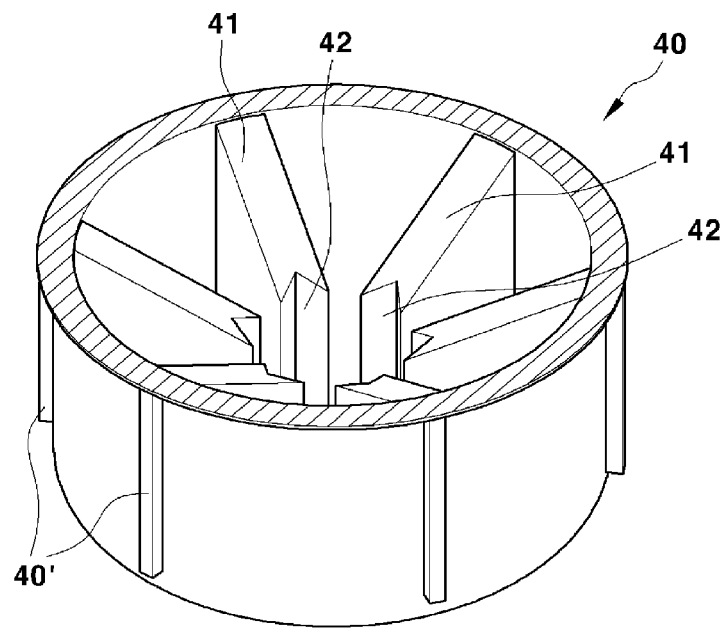
[Fig. 3]
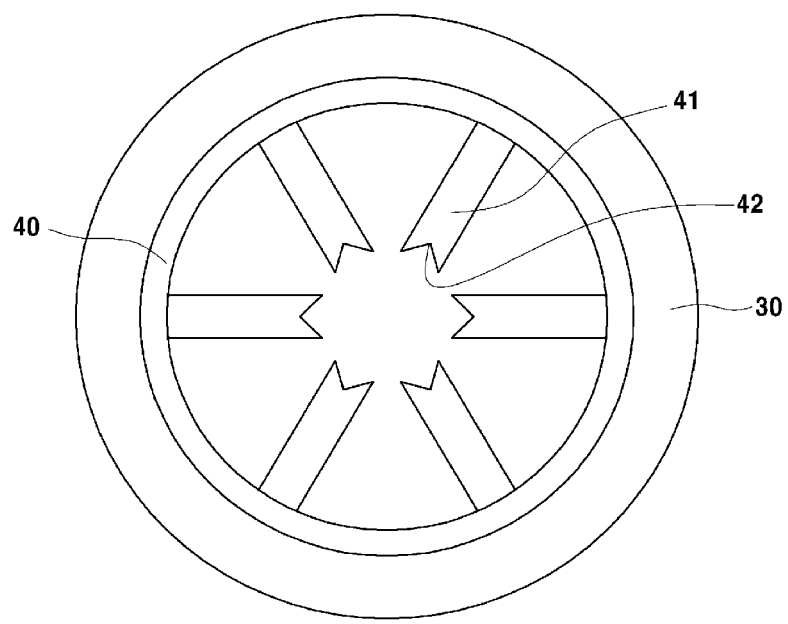

[Fig. 4]
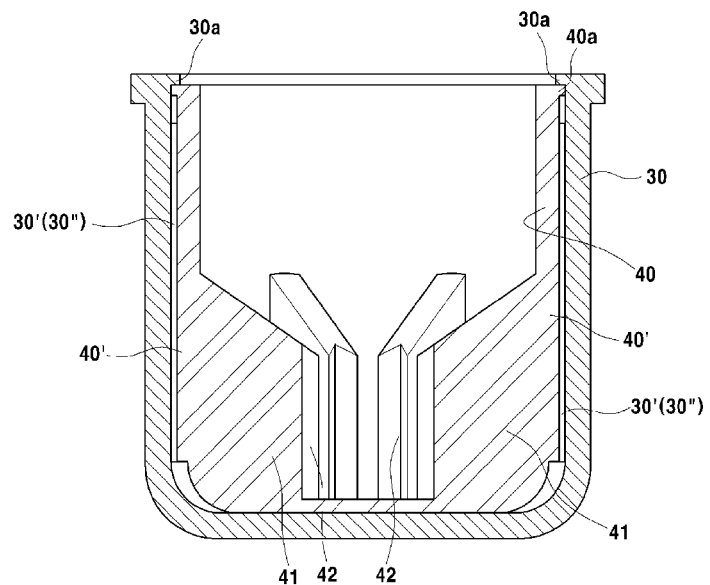
[Fig. 5]
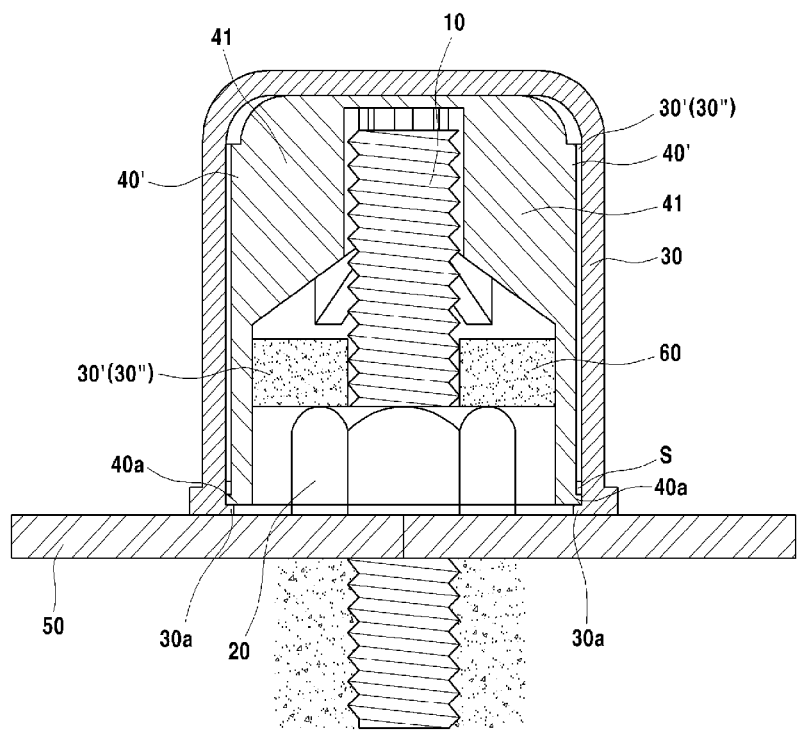

[Fig. 6]
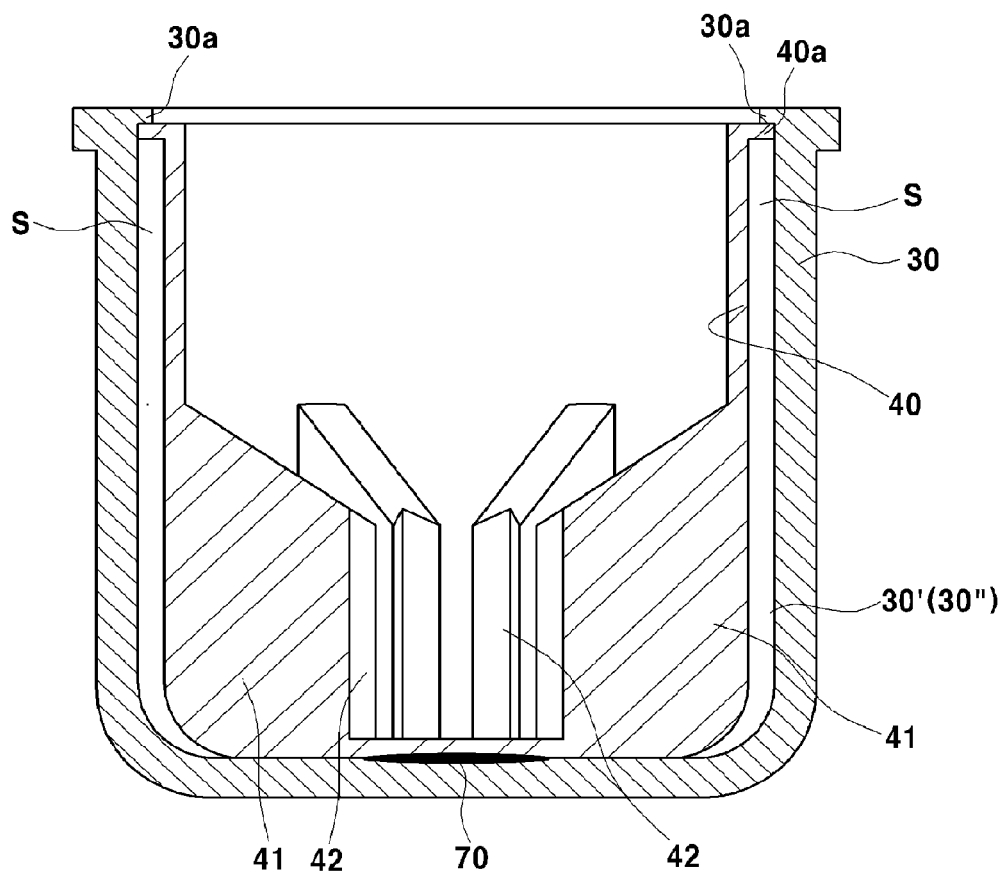

[Fig. 7]
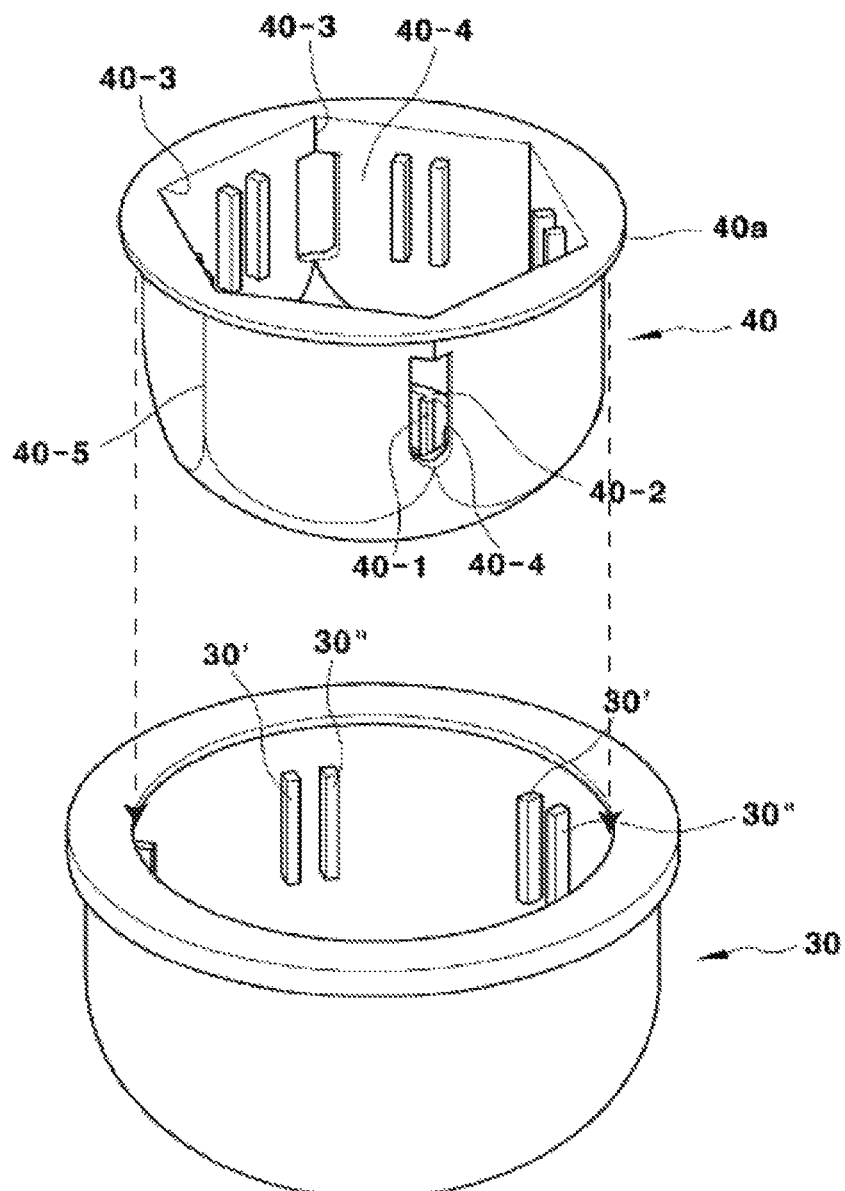

[Fig. 8]
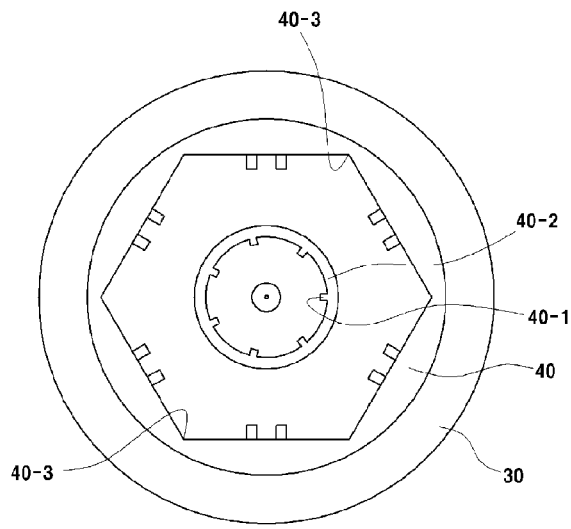
[Fig. 9]
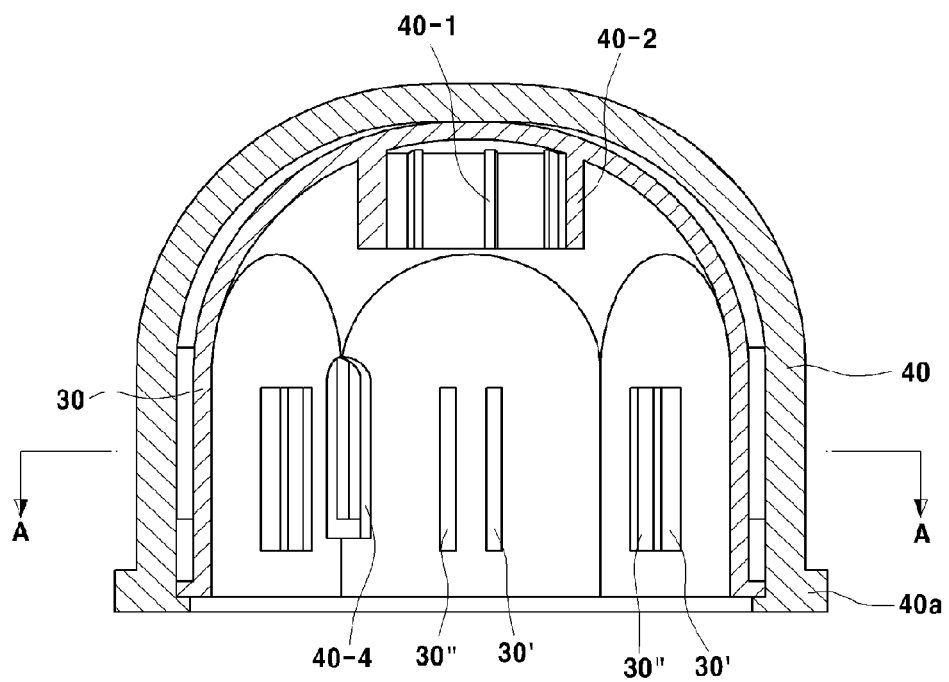

[Fig. 10]
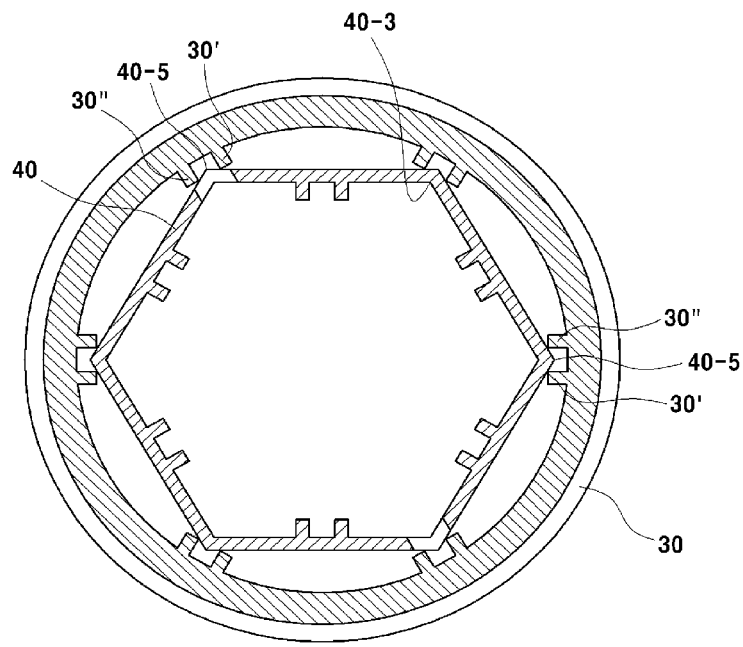
[Fig. 11]
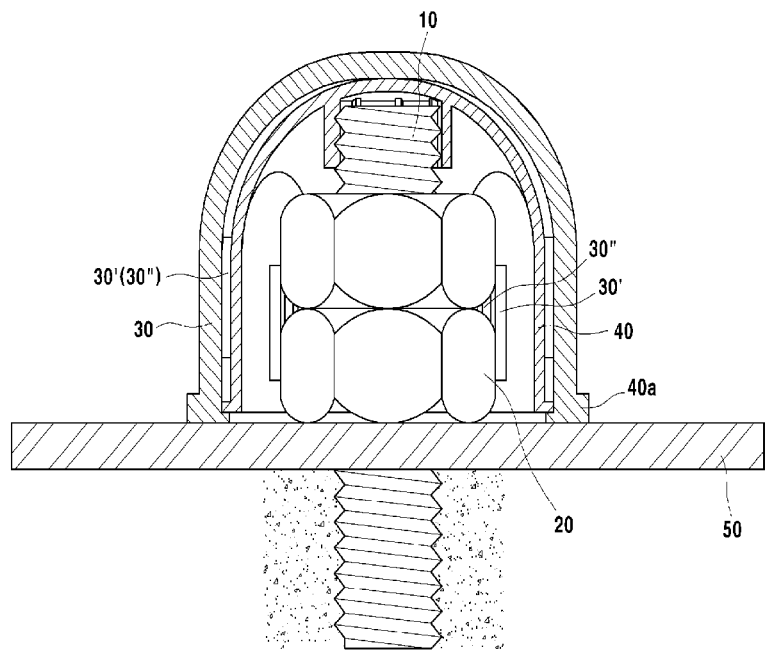

DUAL PROTECTION CAP FOR BOLT AND NUT

CROSS-REFERENCE TO RELATED APPLICATION

This application claims the benefit of Korean Patent Application No. 10-2011-0023368, filed on Mar. 16, 2011 in the Korean Intellectual Property Office, the disclosure of which is incorporated herein by reference.

TECHNICAL FIELD

The present invention relates to a dual protection cap for a bolt and a nut.

BACKGROUND ART

In general, a protection cap for a bolt and a nut is a bolt and nut interception member inserted into bolt and nut portions to prevent the bolt and the nut from oxidizing and to improve a stiff atmosphere of the bolt and the nut.

Such a conventional dual protection cap for a bolt and a nut is generally formed in a cap shape having opened one side that covers and protects an outer protruded portion of a bolt and a nut formed to fasten and fix a base plate that supports a structure such as a streetlight or a soundproof wall to the ground.

More specifically, a conventional protection cap for a bolt and a nut is an interception member for covering and protecting a bolt, a nut, and a washer using a plastic material or a rubber material so as to prevent a bolt and a nut from being wet and rusted due to rain and wind, and a screw thread is formed to couple the bolt and the nut at an inner circumferential surface of a cap main body, and thus the conventional protection cap is generally fixed through bolt and screw coupling.

However, because the above-described conventional protection cap for a bolt and a nut is generally made of a plastic material or a rubber material, when an organic chemical material is exposed at sunlight in view of a characteristic of a plastic or rubber material, an organic chemical component is volatilized to be stiffly hardened and deteriorated and thus there is a problem that the conventional protection cap is easily damaged by an external pressure.

Particularly, when a temperature rises in a summer season, if a bolt and a nut, which are a metal component expand by a heat, in a state in which a protection cap having different expansion coefficients is deteriorated and hardened, there is a problem that the protection cap does not withstand expansion of the bolt and the nut and is damaged.

As described above, when a protection cap for a bolt and a nut is damaged, the protection cap loses a function of maintaining airtightness from the outside, and thus there is a problem that the bolt and the nut are oxidized by rainwater or moisture.

DISCLOSURE

Technical Problem

In order to solve the problem, Korean Patent Laid-Open Publication No. 10-2009-0048822 titled "protection cap for bolt and nut" was filed by the present applicant, and in a one side open type protection cap for a bolt and a nut for separating a bolt and a nut from the outside by covering the bolt and the nut of Korean Patent Laid-Open Publication No. 10-2009-0048822, an inner cover and an outer cover doubly form a cap main body at a gap, a support piece that supports the inner cover to the outer cover is radially connected between the inner cover and the outer cover, and at an inner circumferential surface of the inner cover, while a fixed piece is crushed when compulsorily inserting into the bolt and the nut and by forming the radial fixed piece in an inside direction to couple to the bolt and the nut, in a state in which the protection cap is fixed to the bolt and the nut, and when a volume of the bolt and the nut expands as an ambient temperature increases, the fixed piece is further crushed, and even if the inner cover is somewhat pushed in an outside direction by the fixed piece, while the support piece is bent between the inner cover and the outer cover, the support piece performs a buffer action and thus the outer cover is prevented from being deformed or damaged.

Further, the fixed piece responds while being crushed according to an external form of the bolt and the nut, and thus the fixed piece can be applied to any bolt and nut having no great specification difference.

However, in this case, as the inner cover and the outer cover doubly form a cap main body at a gap, when the cap is injection molded, in order to integrally form the inner cover, the outer cover, and the fixed piece in a mold, when at least secondary mold operation performs, a product is produced, and coolant is not transferred to a mold structure for separating and blocking space between the inner cover and the outer cover, and thus an injection production time is much consumed and product productivity is thus greatly deteriorated and thus a product production cost ratio is relatively large and thus there is a productivity deterioration problem that may be fallen behind in international market competitive power and in Asia, the bolt uses a mm specification, but in USA, the bolt uses an inch specification and thus several bolt cap mold production costs are added and thus there is a problem of a cost increase factor.

Further, in a state in which an upper surface (bottom surface upon installing) between the inner cover and the outer cover contacts with a surface of a base plate that supports a structure, in order to prevent a bolt from rusting, by inserting rubber packing into the bolt, the rubber packing may be installed in the bolt, but a micro gap is formed between the upper surface (bottom surface upon installing) of the inner cover and the outer cover and the base plate and thus moisture is soaked into the cap and thus the rubber packing is corroded and thus there is a problem that cannot maintain a bolt cap installation state.

Technical Solution

In accordance with an aspect of the present invention, there is a one side open type dual protection cap for a bolt and a nut for separating a bolt and a nut from the outside by covering the bolt and the nut, wherein an outer cap and an inner cap each are made of a synthetic resin by injection molding, a protrusion piece protruded at a predetermined gap in a length direction at an outer circumference of the inner cap is inserted into and coupled to insertion groove pieces formed at a predetermined gap in a length direction at the inside of the outer cap, and at an end portion of each of fixed pieces radially protruded at a circumferential surface of a bottom portion within the inner cap, a triangular protrusion is formed.

Advantageous Effects

A dual protection cap for a bolt and a nut according to the present invention brings a product productivity increase effect and a product production cost reduction effect by injection molding an outer cap and an inner cap separately from a synthetic resin ((polypropylene (PP), polyethylene (PE), and poly (vinyl chloride) (PVC)), and by inserting the outer cap and the inner cap by an insertion groove piece and a protrusion piece, the outer cap and the inner cap are securely coupled, and particularly, a circumference of an upper circumference surface of the outer cap is inserted by a protrusion jaw formed by an upper circumferential edge of the outer cap and thus the outer cap and the inner cap are compulsorily securely coupled.

Further, in the present invention, because two caps are made of a synthetic resin, nature damage by two-cap contraction and hardening is prevented.

Further, as the inner cap and the outer cap are compulsorily inserted, at a circumferential surface of a bottom surface within the inner cap, when a triangular protrusion formed in an end portion of each of radially protruded fixed pieces is easily crushed by a bolt, the bolt is securely coupled to a fixed piece and thus a screw thread of the bolt is formed in an end portion of the fixed piece, and thus when the bolt is damaged or when the bolt is disjointed, by rotating the bolt in a screw method, the fixed piece is easily separated from the bolt, and when reusing a bolt cap later, the screw thread is formed in the fixed piece and thus upon coupling the inner cap, by rotating the inner cap in a screw method, an economical gain that can reuse the bolt cap is obtained.

Further, by pressing and mounting a nut by inserting fiber packing into a bolt coupled to the inside of the inner cap, a dual protection cap for a bolt and a nut of the present invention prevents the nut from being loosened by a vibration due to the fiber packing, and when grease is housed in the fiber packing, the grease does not flow and is contained within the fiber packing for a long time and thus a rust prevention effect of the bolt and the nut is continued, and particularly, when fiber packing formed with natural wool is used, even if the grease is not housed in the fiber packing with a function of adjusting moisture, moisture can be adjusted and thus the bolt and the nut can be prevented from rusting.

Further, in the present invention, after a dual bolt cap is mounted, when a long time has elapsed, if an outer cap is contracted and hardened by sunlight or a temperature difference, the outer cap is contracted and hardened, but as an oily component of a synthetic resin material does not evaporate, even if a bolt is expanded by a heat, the inner cap protected by the outer cap has elasticity to expand and thus the inner cap prevents the bolt cap from being damaged. When the bolt cap is damaged in a bridge or a ship steel tower, a bolt cap replacement and repair problem is a large problem, and a bolt cap replacement and repair cost is much paid with personal expanses of an upper floor work expert.

BRIEF DESCRIPTION OF DRAWINGS

FIG. 1 is an exploded perspective view illustrating a configuration of a dual protection cap for a bolt and a nut according to an exemplary embodiment of the present invention.

FIG. 2 is a partially cut-away perspective view illustrating a configuration of a dual protection cap for a bolt and a nut according to an exemplary embodiment of the present invention.

FIG. 3 is a top plan view illustrating a configuration of a dual protection cap for a bolt and a nut according to an exemplary embodiment of the present invention.

FIG. 4 is a cross-sectional view illustrating a configuration of a dual protection cap for a bolt and a nut according to an exemplary embodiment of the present invention.

FIG. 5 is a cross-sectional view illustrating a configuration of a dual protection cap for a bolt and a nut and a coupling state between a bolt and a nut according to an exemplary embodiment of the present invention.

FIG. 6 is a cross-sectional view illustrating a configuration of a dual protection cap for a bolt and a nut according to another exemplary embodiment of the present invention.

FIG. 7 is an exploded perspective view illustrating a configuration of a dual protection cap for a bolt and a nut according to another exemplary embodiment of the present invention.

FIG. 8 is a top plan view illustrating the dual protection cap for a bolt and a nut of FIG. 7.

FIG. 9 is a cross-sectional view illustrating the dual protection cap for a bolt and a nut of FIG. 7.

FIG. 10 is a top plan view illustrating the dual protection cap for a bolt and a nut of FIG. 9.

FIG. 11 is a cross-sectional view illustrating a use state of the dual protection cap for a bolt and a nut of FIG. 7.

<Description of Reference Numerals Indicating Primary Elements in the Drawings>

| | |
|---|---|
| 10: bolt | 20: nut |
| 30: outer cap | 30', 30'': insertion groove piece |
| 30a: latch ring frame | 40: inner cap |
| 40': protrusion piece | 40a: circumferential edge |
| 41: fixed piece | 42: triangular protrusion |
| 40-1: insertion protrusion piece | 40-2: protruded insertion portion |
| 40-3: groove portion | 40-4: hole |
| 40-5: protruded portion | S: space portion |
| 50: base plate | 60: fiber packing |

BEST MODES FOR CARRYING OUT THE INVENTION

Before describing the present invention, the accompanying drawings for helping comprehension of technology are as follows. FIG. 1 is an exploded perspective view illustrating a configuration of a dual protection cap for a bolt and a nut according to an exemplary embodiment of the present invention, FIG. 2 is a partially cut-away perspective view illustrating a configuration of a dual protection cap for a bolt and a nut according to an exemplary embodiment of the present invention, FIG. 3 is a top plan view illustrating a configuration of a dual protection cap for a bolt and a nut according to an exemplary embodiment of the present invention, FIG. 4 is a cross-sectional view illustrating a configuration of a dual protection cap for a bolt and a nut according to an exemplary embodiment of the present invention, FIG. 5 is a cross-sectional view illustrating a configuration of a dual protection cap for a bolt and a nut and a coupling state between a bolt and a nut according to an exemplary embodiment of the present invention, FIG. 6 is a cross-sectional view illustrating a configuration of a dual protection cap for a bolt and a nut according to another exemplary embodiment of the present invention, FIG. 7 is an exploded perspective view illustrating a configuration of a dual protection cap for a bolt and a nut according to another exemplary embodiment of the present invention, FIG. 8 is a top plan view illustrating the dual protection cap for a bolt and a nut of FIG. 7, FIG. 9 is a cross-sectional view illustrating the dual protection cap for a bolt and a nut of FIG. 7, FIG. 10 is a top plan view illustrating the dual protection cap for a bolt and a nut of FIG. 9, and FIG. 11 is a cross-sectional view illustrating a use state of the dual protection cap for a bolt and a nut of FIG. 7.

Hereinafter, the present invention will be described in detail with reference to the drawings.

First, as shown in FIGS. 1 to 5, in a one side open type protection cap for a bolt and a nut 100 for separating a bolt 10 and a nut 20 from the outside by covering the bolt 10 and the nut 20, an outer cap 30 and an inner cap 40 each are injection molded with a synthetic resin, but a protrusion piece 40' protruded at a predetermined gap in a length direction in an outer circumference of the inner cap 40 is inserted into and coupled to insertion groove pieces 30' and 30" formed at a predetermined gap in a length direction at the inside of the outer cap 30, and in an end portion of each of the radially protruded fixed pieces 41 at a circumference surface of a bottom portion within the inner cap 40, a triangular protrusion 42 is formed, and when the bolt 10 and the nut 20 are compulsorily inserted into the inner cap 40, while a front end triangular protrusion 42 of the fixed piece 41 is collapsed, the bolt 10 is inserted into an inside end portion of the fixed piece 41 to be coupled to the fixed piece 41. As an end portion of the triangular protrusion 42 is formed in a small thickness and a narrow width, when the bolt 10 contacts with the triangular protrusion 42 and is compulsorily inserted, the triangular protrusion 42 is collapsed.

In the foregoing description, at the inside of a circumferential edge of the outer cap 30, a latch ring frame 30a is formed, and when the inner cap 40 is inserted into the outer cap 30, a circumferential edge 40a of the inner cap 40 is latched to the outer cap 30.

In this case, when the inner cap 40 is compulsorily inserted into the outer cap 30, the circumferential edge 40a of the inner cap 40 is forcedly inserted into the latch ring frame 30a of the outer cap 30 to be latched to the latch ring frame 30a of the outer cap 30, and by striking the outer cap 30 by a hammer, the outer cap 30 is inserted into the inner cap 40 or by striking the inner cap 40 by a hammer, the inner cap 40 is inserted into the outer cap 30.

In an exemplary embodiment according to the present invention of such a structure, the inner cap 40 and the outer cap 30 are compulsorily inserted, i.e., the protrusion piece 40' of the inner cap 40 is inserted between inside insertion groove pieces 30' and 30" of the outer cap 30, and by compulsorily inserting the protrusion piece 40', the circumferential edge 40a of the inner cap 40 compulsorily enters into the outer cap 30 to be latched to the latch ring frame 30a of the outer cap 30 and thus the inner cap 40 and the outer cap 30 are securely coupled, and in this case, a space portion S is formed at an inner circumference of the outer cap 30 and an outer circumference of the inner cap 40, and thus after the dual protection cap of the present invention is mounted, when a long time has elapsed, even if the outer cap 30 is contracted and hardened by sunlight or a temperature difference, an oily component of a synthetic resin material of the inner cap 40 protected by the outer cap 30 does not evaporate and thus the inner cap and the outer cap of a bolt and a nut is prevented from being damaged, and even if the bolt 10 is expanded by a heat, the inner cap 40 has elasticity to expand and thus the bolt cap is prevented from being damaged.

As shown in FIG. 5, when the nut 20 and the bolt 10 fastened and fixed to a base plate 50 that supports a structure such as a bridge, a ship steel tower, a streetlight, or a soundproof wall are compulsorily inserted into the fixed piece 41 within the inner cap 40, while the triangular protrusion 42 formed in a front end portion of the fixed piece 41 is crushed by the bolt 10, a screw portion is formed in the front end portion of the fixed piece 41 and thus the bolt 10 is inserted into the screw portion.

In the foregoing description, when a dual protection cap for a bolt and a nut of the present invention is installed, after the inner cap 40 and the outer cap 30 are coupled, the coupled inner cap 40 and outer cap 30 may be mounted in the bolt 10 or after the inner cap 40 is first mounted in the bolt 10, the outer cap 30 may be coupled to the inner cap 40. Further, in the present invention, by inserting fiber packing 60 into the bolt 10 coupled to the inside of the inner cap 40, the nut 20 is pressed and mounted and thus the nut 20 is thus prevented from being loosed by a vibration due to the fiber packing 60, and when the fiber packing 60 houses grease, the grease does not flow and is contained within the fiber packing 60 for a long time, and a rust prevention effect of the bolt 10 and the nut 20 is continued, and particularly, when the fiber packing 60 made of natural wool is used, even if grease is not housed in the fiber packing 60 with a function of adjusting moisture, moisture can be adjusted and thus the bolt 10 and the nut 20 can be prevented from rusting.

In this way, the bolt 10 and the nut 20 are doubly protected by the inner cap 40 and the outer cap 30, and when a structure such as a bridge or a streetlight is changed or replaced, if the inner cap 40 and the outer cap 30 are disjointed from the bolt 10, as described above, the triangular protrusion 42 of the fixed piece 41 is crushed by insertion of the bolt 10, but because a screw portion is formed in a front end portion of the fixed piece 41, when the inner cap 40 and the outer cap 30 rotate about the bolt 10, while the inner cap 40 and the outer cap 30 rotate in a screw direction, the inner cap 40 and the outer cap 30 are loosened to be disjointed, and when reusing the inner cap 40 and the outer cap 30, a screw thread is formed at the front end portion of the fixed piece 41 and thus the inner cap 40 and the outer cap 30 are coupled by rotating about the bolt 10 with a non-compulsory method.

FIG. 6 illustrates a cross-sectional view illustrating a configuration of a dual protection cap for a bolt and a nut according to another exemplary embodiment of the present invention, and by high frequency welding a contact portion 70 that contact bottom portions of the inner cap 40 and the outer cap 30, the inner cap 40 and the outer cap 30 may be coupled or by bonding an inner surface of the contact portion 70 by an adhesive or by performing a thermal processing at an inner surface of the contact portion 70, the inner cap 40 and the outer cap 30 may be coupled. In this case, the inner cap 40 and the outer cap 30 can be coupled without insertion groove pieces 30' and 30" of the outer cap 30 and the protrusion piece 40' of the inner cap 40, and the outer cap 30 may be provided by shaping a metal material according to a welding method of the contact portion 70.

FIGS. 7 to 11 illustrate a configuration of a dual protection cap for a bolt and a nut according to another exemplary embodiment of the present invention, and in a nut 20 and a bolt 10 fastened and fixed to a base plate 50, when the bolt 10 has a short length and the nut 20 is doubly fastened, the short bolt 10 cannot be inserted into a fixed piece 41 and thus by installing a protrusion insertion portion 40-2 having a insertion protrusion piece 40-1 integrally radially formed in a central portion within an upper portion of an inner cap 40, the bolt 10 is coupled to the nut and thus the inner cap 40 covers and protects the bolt 10 and the nut 20, and the nut 20 generally forms a hexagon, and at the inside of the inner cap 40, a hexagonal groove portion 40-3 is formed to insert a hexagonal protrusion of the nut 20, and in an intermediate portion of the front side and the rear side of the inner cap 40, a hole 40-4 for elasticity is formed, and when a hexagonal protrusion of the nut 20 is inserted into the hexagonal groove portion 40-3 within the inner cap 40, and an edge and a surface of the nut 20 push an inner circumferential surface of the inner cap 40 to the outside and thus by a buffer operation, the inner cap 40 and the outer cap 30 securely close contact and are coupled.

Six protruded portions 40-5 formed at the outside of the inner cap 40 are inserted into six insertion groove pieces 30' and 30" radially protruded at a circumference of an inside portion of the outer cap 30.

When the nut 20 is inserted into the inner cap 40, the hexagonal groove portion 40-3 within the inner cap 40 enables to a portion of the inner cap 40 to be separated so that an outer circumferential surface of the inner cap 40 close contacts with an inner circumferential surface of the outer cap 30 and thus the inner cap 40 securely close contact with and couples to the outer cap 30.

In the foregoing exemplary embodiment, as in the first exemplary embodiment, a circumferential edge 40a of the inner cap 40 compulsorily enters into the outer cap 30 to be latched to a latch ring frame 30a of the outer cap 30.

In the foregoing description, a screw may be formed instead of the insertion protrusion piece 40-1 formed within the protrusion insertion portion 40-2.

Reference numeral 40-5 indicates a reinforced protrusion.

In another exemplary embodiment of the present invention, while a hexagonal protrusion of the nut 20 is inserted into a hexagonal groove portion 40-3 of the inner cap 40 without the insertion groove pieces 30' and 30" of the outer cap 30 or the protrusion piece 40' of the inner cap 40, the nut 20 pushes the inner cap 40 to the outside and thus the inner cap 40 and the outer cap 30 close contact and are coupled, and the circumferential edge 40a of the inner cap 40 compulsorily enters into the outer cap 30 to be latched to a latch ring frame 30a of the outer cap 30 and thus the inner cap 40 and the outer cap 30 enclose the bolt 10 and the nut 20 to doubly protect, and when the nut 20 has a polygonal shape, not a hexagonal shape or when the nuts 20 are alternately coupled, in order to correspond thereto, an inner shape of the inner cap 40 may be formed in a polygonal shape or a waveform shape, not a hexagonal shape.

The invention claimed is:

1. A one side open type dual protection cap (100) for a bolt and a nut for separating a bolt (10) and a nut (20) from the outside by covering the bolt (10) and the nut (20), wherein an outer cap (30) and an inner cap (40) each are made of a synthetic resin by injection molding, a protrusion piece (40') protruded at a predetermined gap in a length direction at an outer circumference of the inner cap (40) is inserted into and coupled to insertion groove pieces (30') and (30") formed at a predetermined gap in a length direction at the inside of the outer cap (30), and at an end portion of each of fixed pieces (41) radially protruded at a circumferential surface of a bottom portion within the inner cap (40), a triangular recess (42) is formed.

2. The dual protection cap for a bolt and a nut of claim 1, wherein at the inside of a circumferential edge of the outer cap (30), a latch ring frame (30a) is formed, and when the inner cap (40) is inserted into the outer cap (30), a circumferential edge (40a) of the inner cap (40) is latched to the outer cap (30).

3. The dual protection cap for a bolt and a nut of claim 1, wherein a contact portion (70) that contacts bottom portions of the inner cap (40) and the outer cap (30) is coupled by high frequency welding.

* * * * *